United States Patent
T. et al.

(10) Patent No.: US 9,641,653 B2
(45) Date of Patent: May 2, 2017

(54) METHOD AND APPARATUS FOR DETERMINING A SYNCHRONIZATION OF SUBSCRIPTION-NOTIFICATION SERVICE SUBSCRIPTIONS AMONG MULTIPLE ENTITIES

(71) Applicants: Satyanarayana T., Karnataka (IN); Anees Abdulkader Anakkot, Kerala (IN); Tyrone D. Bekiares, Park Ridge, IL (US)

(72) Inventors: Satyanarayana T., Karnataka (IN); Anees Abdulkader Anakkot, Kerala (IN); Tyrone D. Bekiares, Park Ridge, IL (US)

( * ) Notice: Subject to any disclaimer, the term of this patent is extended or adjusted under 35 U.S.C. 154(b) by 916 days.

(21) Appl. No.: 13/652,641

(22) Filed: Oct. 16, 2012

(65) Prior Publication Data
US 2014/0068091 A1    Mar. 6, 2014

Related U.S. Application Data

(60) Provisional application No. 61/695,923, filed on Aug. 31, 2012.

(51) Int. Cl.
  G06F 15/16    (2006.01)
  H04L 29/06    (2006.01)
  H04L 29/08    (2006.01)

(52) U.S. Cl.
  CPC ............. *H04L 69/28* (2013.01); *H04L 67/24* (2013.01)

(58) Field of Classification Search
  CPC ........................... H04L 67/24; H04L 65/1006
  See application file for complete search history.

(56) References Cited

U.S. PATENT DOCUMENTS 7,283,506 B2    10/2007    Mayer et al.
7,499,926 B1 *    3/2009    Burckart et al.
(Continued)

FOREIGN PATENT DOCUMENTS

EP        2239920 A1    10/2010

OTHER PUBLICATIONS

Rosenberg J., "A Presence Event Package for the Session Initiation Protocol (SIP)," Network Working Group, RFC 3856, Aug. 2004, 26 pages.

(Continued)

*Primary Examiner* — Djenane Bayard

(57) ABSTRACT

A communication system synchronizes subscriptions between a user terminal (UT) and a Subscription Service Host (SSH). The UT conveys, to the SSH, multiple subscription messages associated with a Watcher that each initiates a subscription associated with the Watcher and requests watched entity status information. The UT starts a timer and, in response to an expiration of the timer, conveys a subscription information consolidated status update (SICSU) request to the SSH that requests a consolidated status update of all subscriptions associated with the Watcher. In response, the UT receives an SICSU notification comprising a first one or more SICSU values that indicate a status of multiple subscriptions associated with the Watcher, determines a corresponding second one or more SICSU values based on its own list, compares the first SICSU values to the second SICSU values, and determines whether the UT is out of synchronization with the SSH based on the comparison.

22 Claims, 5 Drawing Sheets

(56) References Cited

U.S. PATENT DOCUMENTS

| | | |
|---|---|---|
| 7,536,481 B2 | 5/2009 | Sekaran et al. |
| 7,707,286 B2 | 4/2010 | Gundu et al. |
| 7,814,051 B2* | 10/2010 | Ben-Ezra et al. ............ 707/609 |
| 7,886,013 B2 | 2/2011 | Christoffersson et al. |
| 8,018,848 B2 | 9/2011 | Baker et al. |
| 8,041,398 B2 | 10/2011 | Hutt et al. |
| 8,060,622 B2 | 11/2011 | Park |
| 8,200,755 B2 | 6/2012 | Fujimoto et al. |
| 8,473,733 B2* | 6/2013 | McColgan et al. ........... 713/151 |
| 2004/0003037 A1 | 1/2004 | Fujimoto et al. |
| 2007/0190978 A1* | 8/2007 | White et al. ............... 455/412.1 |
| 2008/0027996 A1 | 1/2008 | Morris |
| 2008/0098297 A1 | 4/2008 | Sun et al. |
| 2008/0147827 A1* | 6/2008 | Morris .......................... 709/220 |
| 2008/0214170 A1* | 9/2008 | Laflamme et al. ............ 455/418 |
| 2008/0316939 A1* | 12/2008 | Shimamura et al. ......... 370/254 |
| 2009/0055532 A1* | 2/2009 | Oh et al. ...................... 709/225 |
| 2009/0213841 A1* | 8/2009 | Masson ......................... 370/352 |
| 2012/0071178 A1* | 3/2012 | Sun et al. ..................... 455/458 |
| 2012/0117175 A1* | 5/2012 | Rogers et al. ................ 709/206 |

OTHER PUBLICATIONS

Rosenberg J., "A Watcher Information Event Template-Package for the Session Initiation Protocol (SIP)," Network Working Group, RFC 3857, Aug. 2004, 19 pages.

Rosenberg J., "An Extensible Markup Language (XML) Based Format for Watcher Information," Network Working Group, RFC 3858, Aug. 2004, 13 pages.

C. Jennings et al—RFC 5626—Managing Client-Initiated Connections in the Sessions Initiation Protocol (SIP)—Network Working Group—Standards Track—Oct. 2009.

\* cited by examiner

METHOD AND APPARATUS FOR DETERMINING A SYNCHRONIZATION OF SUBSCRIPTION-NOTIFICATION SERVICE SUBSCRIPTIONS AMONG MULTIPLE ENTITIES

CROSS-REFERENCE(S) TO RELATED APPLICATION(S)

The present application claims priority from U.S. provisional application Ser. No. 61/695,923, entitled "METHOD AND APPARATUS FOR DETERMINING A SYNCHRONIZATION OF SUBSCRIPTION-NOTIFICATION SERVICE SUBSCRIPTIONS AMONG MULTIPLE ENTITIES," filed Aug. 31, 2012, which is commonly owned and incorporated herein by reference in its entirety.

FIELD OF THE INVENTION

The present invention relates generally to packet data communication systems, and more particularly to provision of a Subscription-Notification Service, such as a Presence Service, in a packet data communication system.

BACKGROUND OF THE INVENTION

In a presence network, such as the presence service proposed by the Open Mobile Alliance (OMA) standards or a Parlay X-based network, a presence entity, such as a Presentity in an OMA-based system, is a logical entity associated with a Presence User (for example, representing a human or a communication device) that has presence information associated with it. A Presence Source associated with the presence entity provides presence information about the presence entity to a Presence Server, and a Watcher requests presence information about the presence entity from the Presence Server. For example, in an OMA-based system, a Presence Source, implemented in a communication device operated by a first Presence User, may publish presence information to the Presence Server by conveying a Session Initiation Protocol SIP (Session Initiation Protocol) PUBLISH message comprising the presence information to the Presence Server. The presence information includes a current state of user status attributes associated with the presence entity, such as Presence Information Elements in an OMA-based system, for example, a location, an availability, a willingness, a mood, an activity, and so on. The Presence Server then stores the current state of the user status attributes in association with the presence entity. In addition, the Presence Server maintains a profile in association with each presence entity, which profile may include access rules that determine which set of Watchers are authorized to see presence information associated with the presence entity.

A second Presence User may wish to know a state of presence information associated with the first Presence User. In order to be informed of the presence information, a Watcher implemented in a second communication device associated with the second Presence User creates a subscription at the Presence Server to watch the first Presence User and/or to watch a group of Presence Users (also called a 'Resource List'). For example, in an OMA-based system, the Watcher may request to watch by conveying a SIP SUBSCRIBE message to the Presence Server requesting presence information associated with the watched entity (that is, the first User) or group of watched entities (that is, the group of Presences Users). Each subscription has an expiry value associated with it, which expiry value can be requested by a Watcher but overridden by the Presence Server. Prior to the expiration of the expiry value, the Watcher needs to refresh the subscription in order to prevent the subscription from lapsing.

In subscribing to watch a presence entity/group of watched entities, the Watcher may request notification concerning all user status attributes associated with each such presence entity, or may request notification concerning only select user status attributes. If the Watcher is authorized by the Presence Server, for example, by the access rules associated with a presence entity, the Watcher is then provided with a current state of each requested user status attribute, for example, via a SIP NOTIFY message in an OMA-based system.

A Presence Source associated with a presence entity then publishes a presence information update to the Presence Server every time a state of one or more user status attributes changes, regardless of the user status attributes watched by the Watcher/second Presence User. When the Presence Server receives the presence information update, the Presence Server forwards the update to the Watchers that have subscribed to that user status attribute of that presence entity.

In some systems, a Watcher may not know in advance the list of presence entities that may be watched. In such a system, the Watcher may create a new subscription as and when watched entities are added. For example, the Watcher may obtain information about new presence entities through directory updates. As a result, a number of watched entities, and corresponding subscriptions, can be in the range of 150-300 subscriptions per Watcher. Even if Resource Lists are used, the number of Resource Lists and presence entities outside of the Resource Lists, and corresponding subscriptions, may still be in the range of 50-60 subscriptions per Watcher.

Watchers typically refresh their subscriptions just before the subscriptions expire. As a result, subscriptions typically have long expiry values, for example, 3600 seconds (one hour) because when a Watcher goes through a refresh-subscription phase, the Watcher may send a burst of a large set of subscription (SIP SUBSCRIBE) messages, one for each subscription. Such an exchange of messaging can consume significant system capacity in a limited bandwidth communication system, such as a wireless communication system, and can consume excessive communication device power when the first communication device comprises a limited life power supply, such as a battery.

Furthermore, when multiple SIP NOTIFY messages associated with a subscription fail to reach a Watcher, for example, due to deterioration of a quality of the Watcher's, that is, the associated Presence User's, wireless coverage or the associated Presence User roaming outside of an area of wireless coverage, the Presence Server may drop that subscription for the Watcher. In such an instance, until the Watcher refreshes the subscription, the Watcher will not receive SIP NOTIFY messages associated with that subscription even when the associated Presence User regains acceptable coverage and may not even be aware that the subscription has been dropped.

Figure 1:
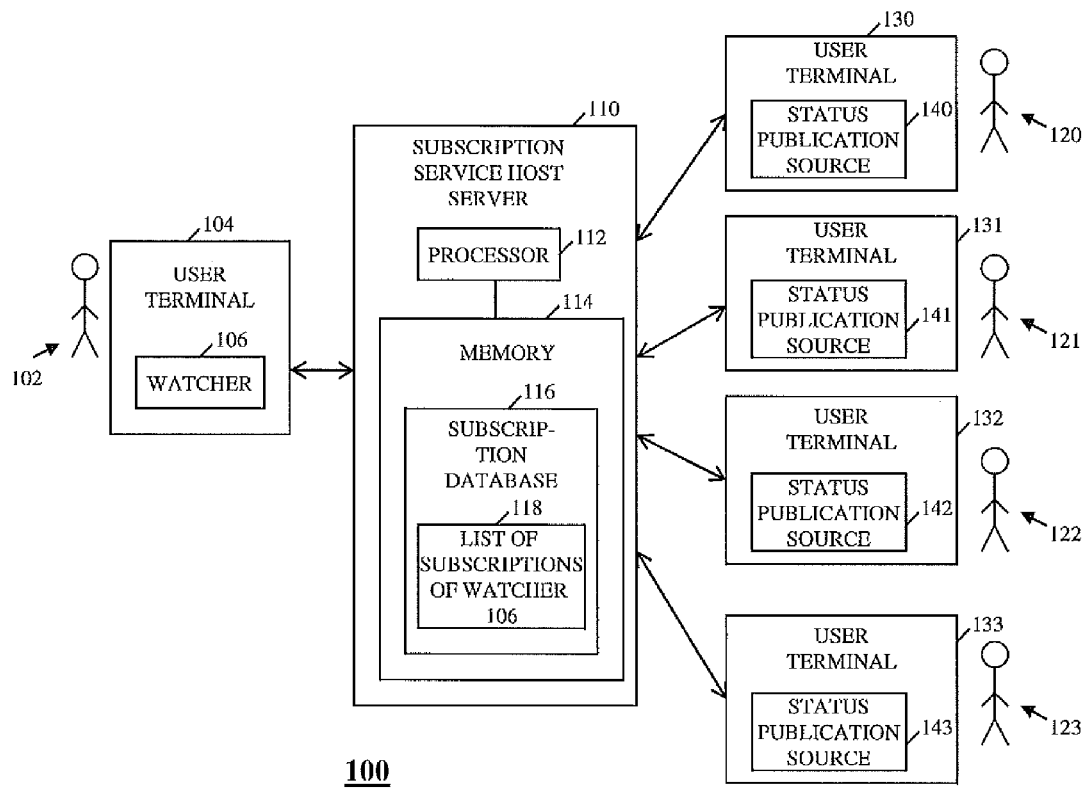
FIG. 1 is a block diagram of a communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need for a method and apparatus that reduces the messaging exchanged between a watched entity, and more particularly a user terminal associated with a Watcher, and a Subscription Service Host in a provision of a Subscription-Notification service, a communication system is provided that synchronizes subscriptions between the user terminal and the Subscription Service Host. The user terminal conveys, to the Subscription Service Host, multiple subscription messages associated with a Watcher, wherein each subscription message of the plurality of subscription messages initiates a subscription associated with the Watcher and requests user status information associated with one or more watched entities. The user terminal further starts a timer and, in response to an expiration of the timer, conveys a subscription information consolidated status update (SICSU) request to the Subscription Service Host, wherein the SICSU request requests that the Subscription Service Host provide a consolidated status update of all subscriptions associated with the Watcher. In response to conveying the SICSU request, the user terminal receives an SICSU notification comprising a first one or more SICSU values, wherein the one or more SICSU values indicate a status of a plurality of subscriptions associated with the Watcher, determines a corresponding second one or more SICSU values based on a list of subscriptions maintained by the user terminal, compares the first one or more SICSU values to the second one or more SICSU values to produce a comparison, and determines whether the user terminal is out of synchronization with the Subscription Service Host based on the comparison.

Generally, an embodiment of the present invention encompasses a method for determining a synchronization with respect to a plurality of presence service subscriptions. The method includes conveying, by a user terminal to a Subscription Service Host, a plurality of subscription messages associated with a Watcher, wherein each subscription message of the plurality of subscription messages initiates a subscription associated with the Watcher and requests user status information associated with one or more watched entities and starting a timer. The method further includes, in response to an expiration of the timer, conveying a subscription information consolidated status update (SICSU) request to the Subscription Service Host, wherein the SICSU request requests that the Subscription Service Host provide a consolidated status update of all subscriptions associated with the Watcher and, response to conveying the SICSU request, receiving an SICSU notification comprising a first one or more SICSU values, wherein the one or more SICSU values indicate a status of a plurality of subscriptions associated with the Watcher. Further, the method includes determining, by the user terminal, a corresponding second one or more SICSU values based on a list of subscriptions maintained by the user terminal and associated with the Watcher, comparing the first one or more SICSU values to the second one or more SICSU values to produce a comparison, and determining, by the user terminal, whether the user terminal is out of synchronization with the Subscription Service Host based on the comparison.

Another embodiment of the present invention encompasses a method for determining a synchronization with respect to a plurality of presence service subscriptions. The method includes maintaining a plurality of subscriptions associated with a Watcher, receiving a subscription information consolidated status update (SICSU) request from a user terminal associated with the Watcher, wherein the SICSU request requests a provision of a consolidated status update of all subscriptions associated with the Watcher, and in response to receiving the SICSU request, conveying a SICSU notification comprising a first one or more SICSU values, wherein each SICSU value of the one or more SICSU values indicate a status of a plurality of subscriptions associated with the Watcher.

Yet another embodiment of the present invention encompasses a user terminal configured to support a presence service. The user terminal includes an at least one memory device that is configured to maintain a list of subscriptions associated with a Watcher implemented by the user terminal. The user terminal further includes a processor that is configured to convey, to a Subscription Service Host, a plurality of subscription messages associated with the Watcher, wherein each subscription message of the plurality of subscription messages initiates a subscription associated with the Watcher and requests user status information associated with one or more watched entities, start a timer, and in response to an expiration of the timer, convey a subscription information consolidated status update (SICSU) request to the Subscription Service Host, wherein the SICSU request requests that the Subscription Service Host provide a consolidated status update of all subscriptions associated with the Watcher. The processor further is configured to, in response to convey the SICSU request, receive a SICSU notification comprising a first one or more SICSU values, wherein the one or more SICSU values indicate a status of a plurality of subscriptions associated with the Watcher, determine a corresponding second one or more SICSU values based on the list of subscriptions maintained by the user terminal and associated with the Watcher, compare the first one or more SICSU values to the second one or more SICSU values to produce a comparison, and determine whether the user terminal is out of synchronization with the Subscription Service Host based on the comparison.

Still another embodiment of the present invention encompasses a Subscription Service Host server configured to support a presence service. The Subscription Service Host server comprises an at least one memory device that is configured to maintain a plurality of subscriptions associated with a Watcher. The Subscription Service Host server further comprises a processor that is configured to receive a subscription information consolidated status update (SICSU) request from a user terminal associated with the Watcher, wherein the SICSU request requests a provision of a consolidated status update of all subscriptions associated with the Watcher and, in response to receiving the SICSU request, conveying a SICSU notification comprising a first one or more SICSU values, wherein each SICSU value of the one or more SICSU values indicate a status of a plurality of subscriptions associated with the Watcher.

The present invention may be more fully described with reference to FIGS. 1-3D. FIG. 1 is a block diagram of a communication system 100 that implements a Subscription-Notification Service in accordance with an embodiment of the present invention. Communication system 100 includes multiple Users 102 and 120-123 (five shown), such as Users in a presence service, that are each associated with a respective user terminal 104, 130-133 such as but not limited to a wireless mobile device, for example, a cellular telephone, a radio telephone, a personal digital assistant (PDA) with radio frequency (RF) capabilities, or a wireless modem that provides RF access to digital terminal equipment (DTE) such as a laptop computer, or a wireline device, such as but not limited to a wireline telephone, a personal computer (PC), a laptop computer, or other digital terminal equipment (DTE) that may interface to a wireline network. Each User 102, 120-123 subscribes to a subscription-notification service, such as a Presence Service, offered by communication system 100. As used herein, a subscription-notification service is a service wherein a user of the system, such as Users 102 and 120-123, subscribes to receive notifications of a user status, or state, of another user of the system, for example, periodically or whenever such state may change.

Users 120-123 are each associated with a watched entity (that is, a logical entity that has status information associated with it), such as a Presentity in a presence service, and other Users, such as User 102, may subscribe to, and be notified of, user status information associated with the watched entity. User terminals 120-123 each implements a respective Status Publication Source 140-143, such as a Presence Source in a presence service, that publishes user status information associated with the watched entity corresponding to the associated User 120-123. User terminal 104 implements a Watcher 106 that may subscribe to user status information, that is, one or more user status attributes, such as a location, an availability, a willingness, a mood, an activity, and so on, associated with the one or more watched entities associated with Status Publication Sources 140-143. For example, User 102, and more particularly Watcher 106, may create a first subscription at a Subscription Service Host server 110 to watch a first watched entity associated with a first User 120 of the multiple Users 120-123, a second subscription to watch a second watched entity associated with a second User 121 of the multiple Users 120-123, and a third subscription to watch a group of watched entities associated with a group of Users (also called a 'Resource List') 122, 123 of the multiple Users 120-123.

In subscribing to the user status information associated with Users 120-123/Status Publication Sources 140-143, Watcher 106 may indicate which user status attributes to include or exclude in notifications, and/or that indicates triggers to send a notification, for example, when a particular user status attribute changes from or to a specified value.

As used herein, a Status Publication Source is a logical entity that provides user status information associated with a watched entity to a Subscription Service Host server, such as Subscription Service Host server 110, and a Watcher is a logical entity that requests user status information from the Subscription Service Host server. User terminal 104 may or may not be associated with a watched entity and may or may not implement a Status Publication Source. Also, as used herein, a watched entity is a logical entity that has user status information associated with it and may be, for example, a person, a communication device, a role, such as a help desk, or a resource, such as a conference room.

Figure 2:
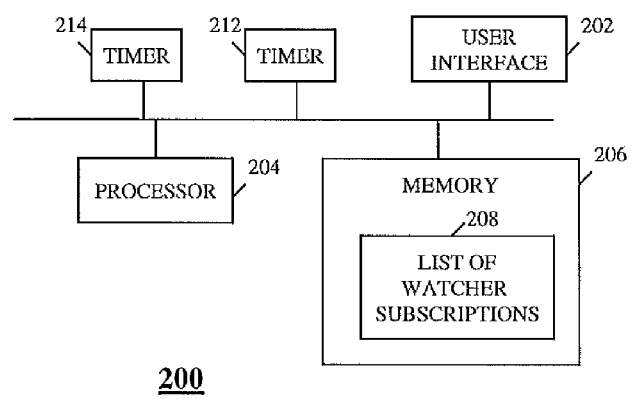
FIG. 2 is a block diagram of a user terminal of FIG. 1 in accordance with an embodiment of the present invention.
Figure 3A:
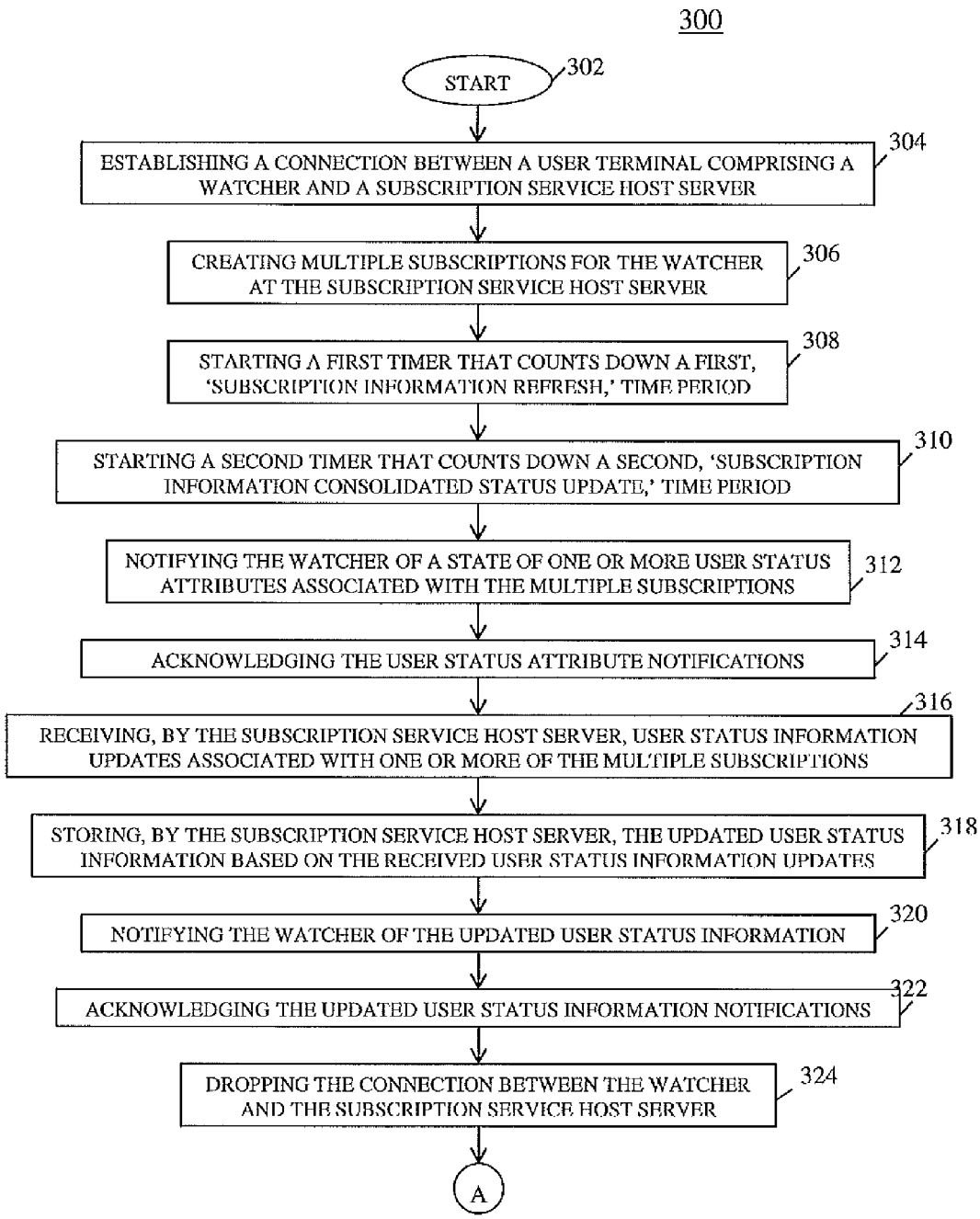
FIG. 3A is a logic flow diagram illustrating a method executed by the communication system of FIG. 1 to synchronize Subscription-Notification Service subscriptions in accordance with various embodiments of the present invention.
Figure 3B:
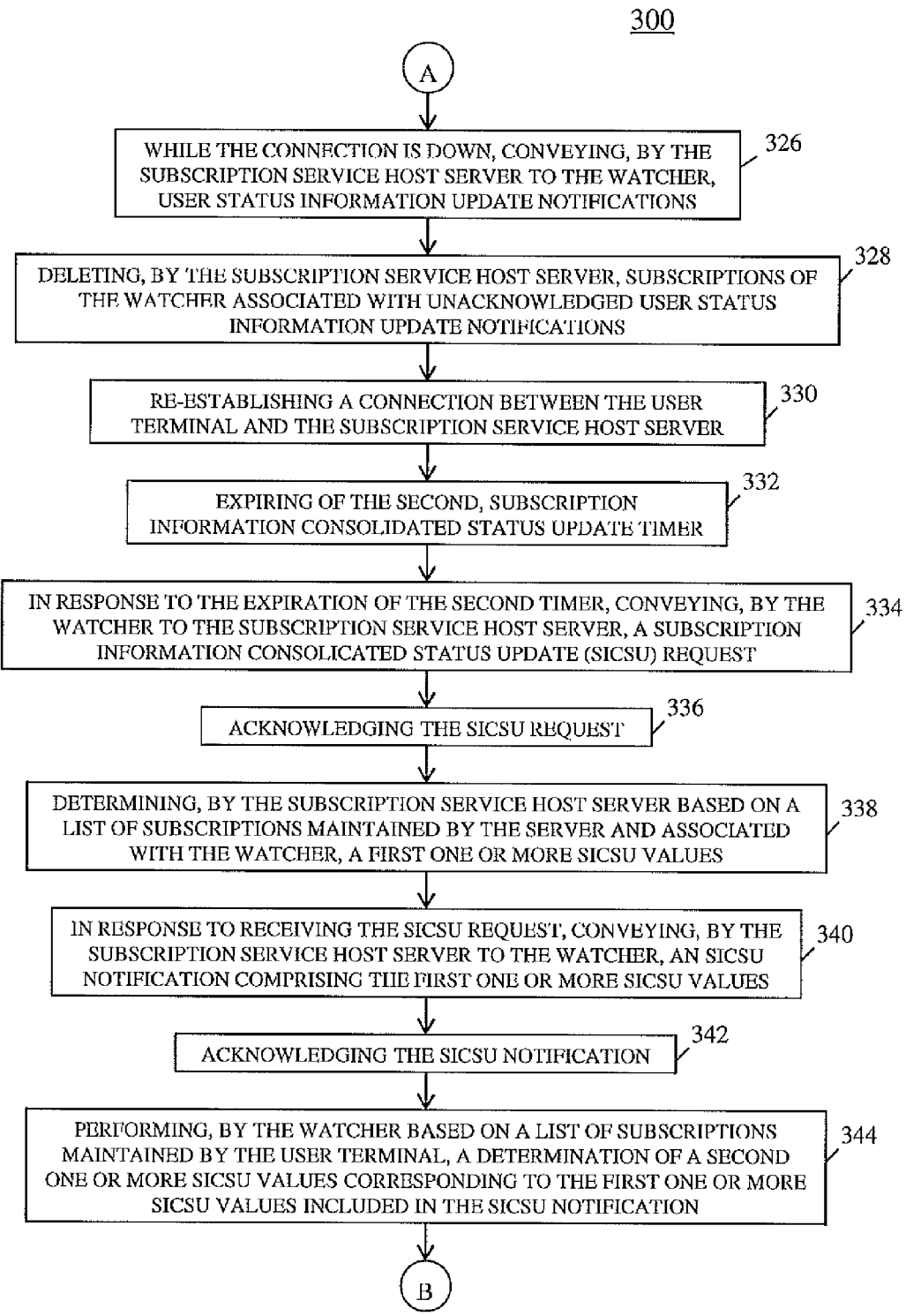
FIG. 3B is a continuation of the logic flow diagram of FIG. 3A illustrating a method executed by the communication system of FIG. 1 to synchronize Subscription-Notification Service subscriptions in accordance with various embodiments of the present invention.
Figure 3C:
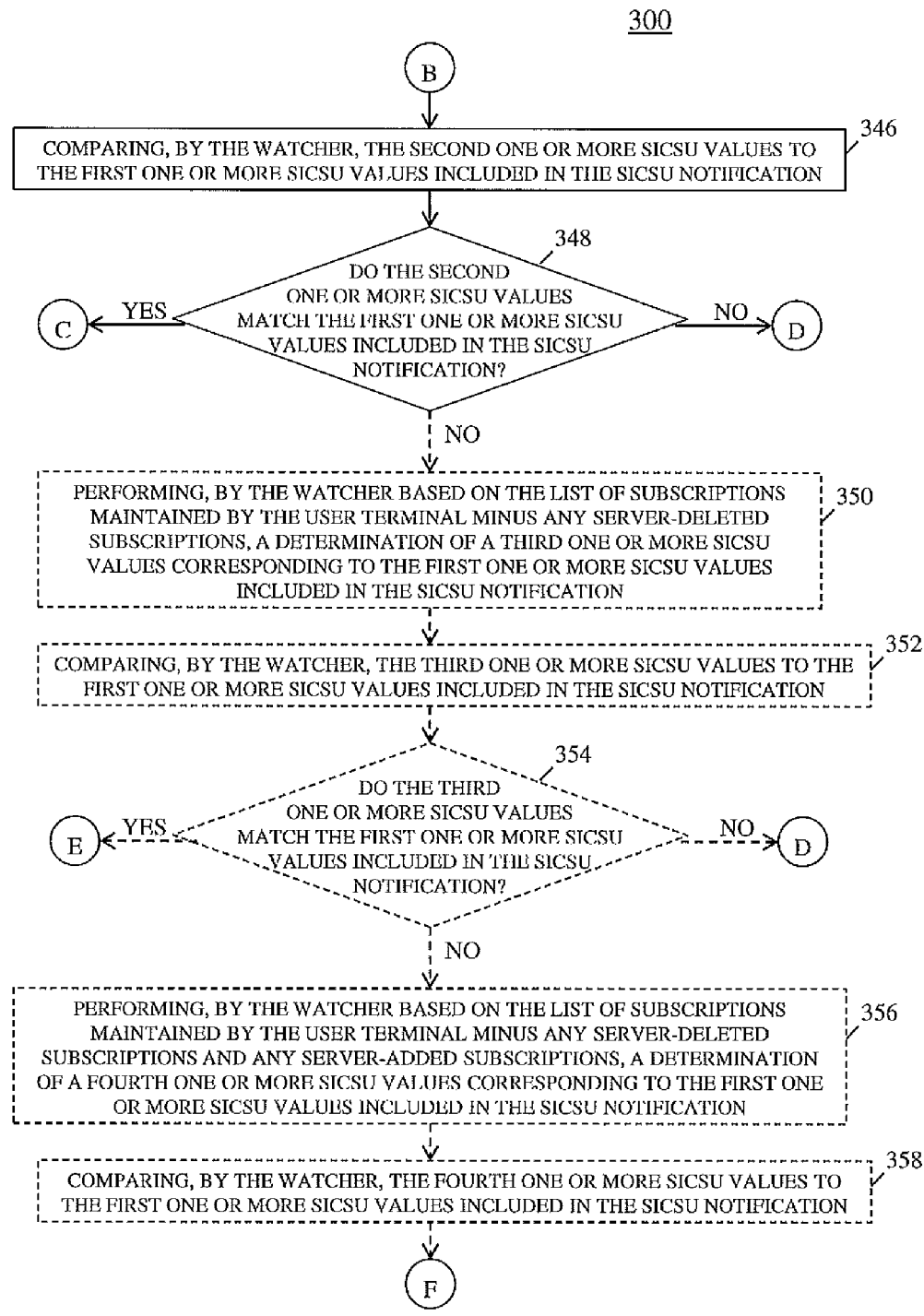
FIG. 3C is a continuation of the logic flow diagrams of FIGS. 3A and 3B illustrating a method executed by the communication system of FIG. 1 to synchronize Subscription-Notification Service subscriptions in accordance with various embodiments of the present invention.
Figure 3D:
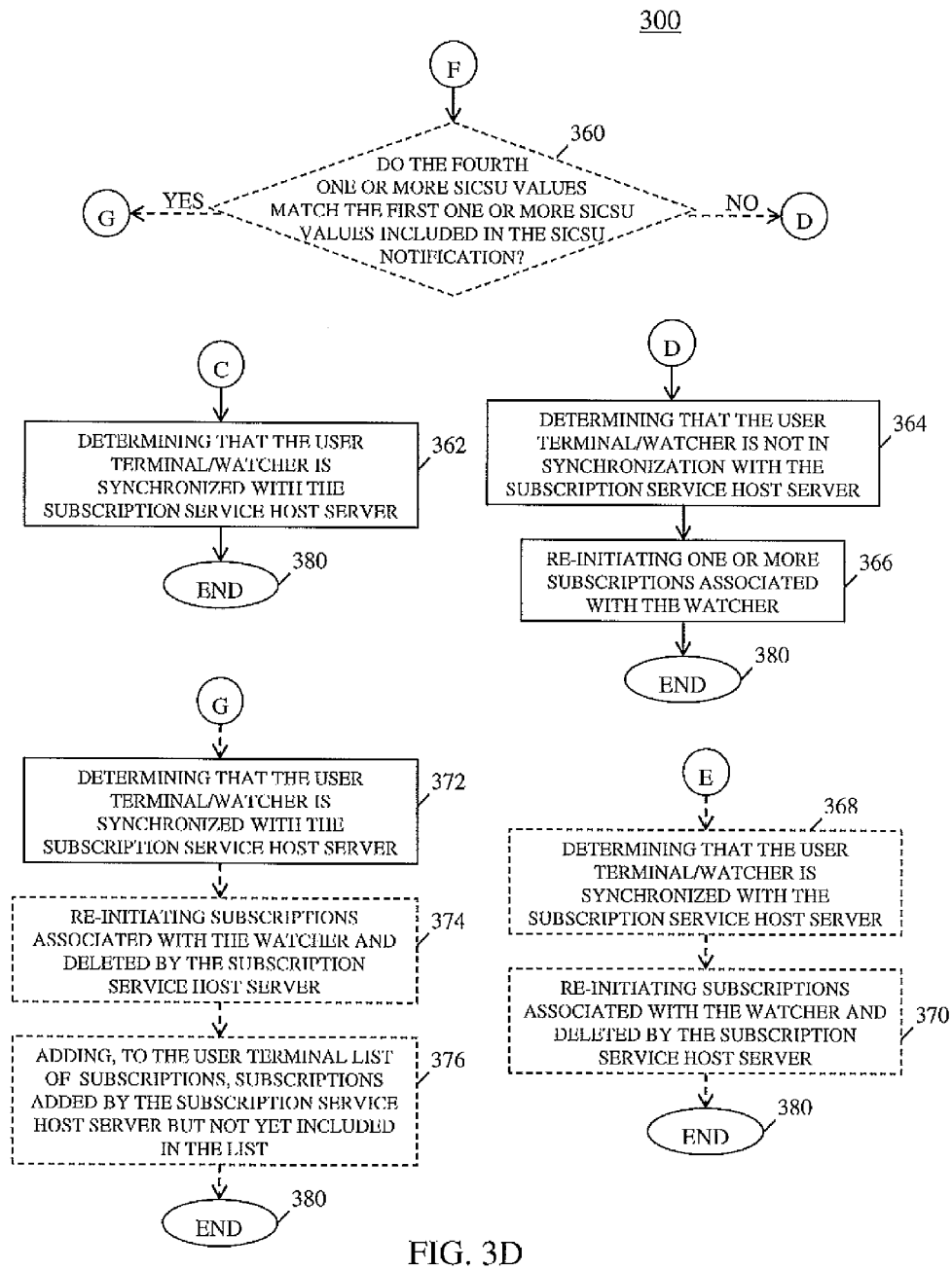
FIG. 3D is a continuation of the logic flow diagrams of FIGS. 3A, 3B, and 3C illustrating a method executed by the communication system of FIG. 1 to synchronize Subscription-Notification Service subscriptions in accordance with various embodiments of the present invention.

FIG. 2 is a block diagram of an exemplary user terminal 200, such as user terminals 104 and 130-133, in accordance with various embodiments of the present invention. UE 200 includes a processor 204, such as one or more microprocessors, microcontrollers, digital signal processors (DSPs), combinations thereof or such other devices known to those having ordinary skill in the art. The particular operations/functions of processor 204, and respectively thus of user terminal 200, is determined by an execution of software instructions and routines that are stored in a respective at least one memory device 206 associated with the processor, such as random access memory (RAM), dynamic random access memory (DRAM), and/or read only memory (ROM) or equivalents thereof, that store data and programs that may be executed by the corresponding processor. At least one memory device further maintains a list of subscriptions 208, of a Watcher (such as Watcher 106) associated with the user terminal's associated User (such as User 102 with respect to user terminal 104), to watch Users and/or groups of Users (also called a 'Resource List' (RLS)) associated with a Presence Service provided by Subscription Service Host server 110.

User terminal 200 further comprises a first, 'subscription refresh' timer 212 that counts down a first timer period and a second, 'subscription information refresh' timer 214 that counts down a second, preferably shorter, time period. The first time period is a time period during which the user terminal holds off refreshing a subscription to watch a User and/or a group of Users (a 'Resource List'). Prior to the each expiration of first timer 212, that is, of the first time period, the user terminal, for example, a Watcher associated with the user terminal, needs to refresh the subscription in order to prevent an associated subscription from lapsing and being deleted by a Subscription Service Host server.

The second time period is a time period expiring between each time the user terminal may request a 'subscription information consolidated status update' refresh, that is, request that a Subscription Service Host server provide a consolidated update on all subscriptions to watch a User/ group of Users subscribed to by the user terminal. In response to expiration of second timer 214, that is, of the second time period, the user terminal, and more particularly a Watcher associated with the user terminal, may request that a Subscription Service Host server provide a consolidated status update of all subscriptions subscribed to by the Watcher. Thus, second, 'subscription information consolidated status update' timer 214 facilitates a user terminal's ability to determine, prior to the expiration of first timer 212, whether one or more subscriptions to watch a User/group of Users have been deleted by the Subscription Service Host server in response to an external event, such as the user terminal losing wireless coverage, without imposing an excessive overhead load, for example, a load that would result from the user terminal inquiring of a status of each subscription one-by-one, upon communication system 100.

In various embodiments of the present invention, the second time period may be a predetermined time period or may be negotiated between user terminal 104, and in particular Watcher 106, and Subscription Service Host server 110. Furthermore, the second time period may be a same time period for all subscriptions of the Watcher or may vary from subscription to subscription. In addition, in various embodiments of the present invention, the user terminal may start/restart second timer 214 in response to a timer trigger event, or the user terminal may continually run second timer 214 wherever the user terminal is subscribed to a presence service, restarting the timer each time the timer expires and/or each time the user terminal requests, and/or receives, a 'subscription information' notification as described in greater detail below.

User terminal 200 further includes a user interface 202 coupled to processor 204 that provides a user of the user terminal with the capability of interacting with the user terminal, including inputting instructions into the user terminal. When user terminal 200 implements one or more of a Status Publication Source, such as Status Publication Sources 140-143, and/or a Watcher, such as Watcher 106, the one or more of the Status Publication Source and Watcher are implemented in an application layer of the processor 204 of the user terminal based on software instructions and routines that are stored in the respective at least one memory device 206 of the user terminal.

Communication system 100 further includes Subscription Service Host server 110, which Subscription Service Host server may be accessed by each of user terminals 104 and 130-133. For example, Subscription Service Host server 110 may be coupled to a data network, such as an Internet Protocol network, and may be accessed by a wireline device via a wireline connection to the data network or by a wireless mobile device via a wireless access network that is, in turn, connected to the data network. Subscription Service Host server 110 includes a processor 112, such as one or more microprocessors, microcontrollers, digital signal processors (DSPs), combinations thereof or such other devices known to those having ordinary skill in the art. The particular operations/functions of processor 112, and thus of the Subscription Service Host server, are determined by an execution of software instructions and routines that are maintained in a respective at least one memory device 114 associated with the processor, such as random access memory (RAM), dynamic random access memory (DRAM), and/or read only memory (ROM) or equivalents thereof, that store data and programs that may be executed by the corresponding processor.

The at least one memory device 114 of Subscription Service Host server 110 further maintains a subscription database 116 that includes a profile in association with each watched entity included in communication system 100, such as the watched entities associated with Users 120-123, which profile includes a set of policies associated with the watched entity, such as access rules that determine which watchers are authorized to see user status information associated with the watched entity, and content rules that determine which user status attributes a particular Watcher is authorized to see. Subscription database 116 further maintains user status information associated with each watched entity hosted by the Subscription Service Host server and published by a Status Publication Source associated with each watched entity. In addition, subscription database 116 may further maintain filtering information such as a request by a Watcher to be notified only of particular user status attributes. In addition, at least one memory device 114 of Subscription Service Host server 110 further maintains, for example, in database 116, for each Watcher served by the Subscription Service Host server, a list of currently active subscriptions of the Watcher, that is, watched entities/Users currently being watched by the Watcher, for example, list 118 with respect to Watcher 106.

The embodiments of the present invention preferably are implemented within user terminals 104 and 130-133 and Subscription Service Host server 110. More particularly, the functionality described herein as being performed by Subscription Service Host server 110 is implemented with or in software programs and instructions stored in the respective at least one memory device 114 of the Subscription Service Host server and executed by an associated processor 112 of the Subscription Service Host server, the functionality described herein as being performed by the watched entity associated with Users 102 and 120-123 may be performed by user terminals 104 130-133. Further, the functionality described herein as being performed user terminals 104 and 130-133, for example, by Watcher 106 of user terminal 104 or by Status Publication Sources 140-143 of user terminals 130-133, is implemented with or in software programs and instructions stored in a respective at least one memory device 206 of a corresponding user terminal and executed by an associated processor 204 of the user terminal. However, one of ordinary skill in the art realizes that the embodiments of the present invention alternatively may be implemented in hardware, for example, integrated circuits (ICs), application specific integrated circuits (ASICs), and the like, such as ASICs implemented in one or more of user terminals 104 and 130-133 and Subscription Service Host server 110. Based on the present disclosure, one skilled in the art will be readily capable of producing and implementing such software and/or hardware without undo experimentation.

Communication system 100 may be any communication system implements a Subscription-Notification Service, wherein a user subscribes to a service that provides the user with notifications of a status, or a change in status, of another user. For example, in one embodiment of the present invention, communication system 100 may be a Presence Service that operates in accordance with, the Internet Engineering Task Force (IETF) and Open Mobile Alliance (OMA) specifications, such as OMA-RD-Presence_SIMPLE-V1_0-20051006-C, OMA-AD-Presence_SIMPLE-V1_0-20051006-C, OMA-TS-Presence_SIMPLE-V1_0-20051222-C, and OMA-TS-Presence_SIMPLEXDM-V1_0-20051222-C, and the IETF specifications referenced therein, including RFC (Request for Comments) 3856, RFC 3857, and RFC 3858, which specifications are hereby incorporated herein in their entirety. As described therein, a Presence Source, such as Status Publication Sources 140-

143, a Watcher, such as Watcher 106, and a Presence Server, such as Subscription Service Host server 110, use Session Initiation Protocol (SIP)-type messaging to exchange presence-related information. In other embodiments of the present invention, communication system 100 may operate in accordance with the Parlay X specifications as jointly defined by the European Telecommunications Standards Institute (ETSI), the Parlay Group, and the Third Generation Partnership Project (3GPP) or in accordance with any other subscription-notification service known in the art.

When one or more of the multiple user terminals 104, 130-133 is a wireless mobile device, the user terminal may use any one of a variety of air interface technologies to transmit packet data over an associated air interface to Subscription Service Host server 110. For example, communication system 100 may comprise one or more of a Code Division Multiple Access (CDMA) communication system, a Global System for Mobile communication (GSM) communication system, a Universal Mobile Telecommunication Service (UMTS) communication system, an Orthogonal Frequency Division Multiple Access (OFDM) communication system, or a Wireless Local Area Network (WLAN) communication system as described by the IEEE (Institute of Electrical and Electronics Engineers) 802.xx standards, for example, the 802.11a, 802.11g, 802.16, or 802.21 standards. As those who are of ordinary skill in the art realize, the type of presence service, and air interface, employed by communication system 100 is not critical to the present invention and communication system 100 may be any type of communication system that supports a subscription-notification service without departing from the spirit and scope of the present invention.

Referring now to FIGS. 3A, 3B, 3C, and 3D, a logic flow diagram 300 is provided that depicts a method executed by communication system 100 to synchronize subscription-notification service subscriptions in accordance with various embodiments of the present invention. Logic flow diagram 300 begins (302) when a first User 102, and more particularly Watcher 106 of user terminal 104, establishes (304) a connection with Presence Server 110 in accordance with known techniques and creates (306) multiple subscriptions at the Subscription Service Host server to watch multiple Users and/or groups of Users (also called a 'Resource List' (RLS)). More particularly, Watcher 106 conveys to Subscription Service Host server 110, and the Subscription Service Host server receives from the Watcher, multiple subscription messages, wherein each subscription message requests user status information associated with a single watched entity (an "individual" subscription) or a group of watched entities (that is, the logical entities representing each User of a group of Presences Users) (a "group," or "RLS," subscription) identified by the message. For example, referring to FIG. 1, Watcher 106 conveys to Subscription Service Host server 110 a first subscription message requesting user status information associated with User 120, a second subscription message requesting user status information associated with User 121, and a third subscription message requesting user status information associated with a group of Users comprising Users 122 and 123.

Each subscription message may include a filter that specifies which user status attributes to include or exclude in notifications, and/or triggers to send a notification, for example when a particular user status attribute changes from or to a specified value. Each subscription message further may include an expiration value, which expiration value can be overridden by Subscription Service Host server 110.

That is, at step 304, Subscription Service Host server 110 creates, and adds to the list of subscriptions 118 associated with Watcher 106 (or creates a subscription list 118 for Watcher 106 if none exists), a first subscription to the watched entity associated with User 120, a second subscription to the watched entity associated with User 121, and a third subscription to the watched entities associated with the group of Users, that is, Users 122 and 123. Each subscription includes a subscription identifier that uniquely identifies the subscription relative to the other subscriptions in the list, such as one or more of a watched entity identifier and a subscription identifier, and further includes an expiry value, which expiry value may comprise the value conveyed by the Watcher to the Subscription Service Host server or may be a value independently set by the Presence Server. Subscription Service Host server 110 further acknowledges receipt of each of the multiple subscription messages, and the creation of the corresponding subscriptions, by conveying subscription confirmation messages 306 to Watcher 106. User terminal 104, and in particular Watcher 106, then adds the confirmed subscriptions to the Watcher's list of subscriptions 208 maintained by the user terminal.

Further, in association with the creation of the subscriptions or sometime subsequent thereto, Watcher 106 starts (308) a first, 'subscription information refresh,' timer 212 that counts down a first, 'subscription information refresh,' time period. The first time period corresponds to a period during which Watcher 106 is supposed to refresh (resubscribe or renew), at Subscription Service Host server 110, all subscriptions of the Watcher and if the Watcher fails to refresh the subscriptions prior to the expiration of the first timer 212, the subscriptions may be deleted at the Presence Server. Typically, in response to the expiration of the first time period, a Watcher would refresh all subscriptions of the Watcher on a subscription-by-subscription basis.

In order to minimize the need for a Watcher to send a burst of a large set of subscription messages, one for each subscription, and further in order to minimize an amount of time that a Watcher may be out-of-synchronization with a Subscription Service Host server as the first time period typically is as long as an hour, communication system 100 further provides second, 'subscription information consolidated status update,' timer 214, which Watcher 106 also starts (310) either concurrent with or sometime subsequent to the starting of first timer 212, and which counts down a second, shorter (then the first time period) 'subscription information consolidated status update' time period. Upon expiration of the second time period, Watcher 106 may request that Subscription Service Host server 110 provide a consolidated status update of all subscriptions subscribed to by Watcher 106. As described in greater detail below, the consolidated status update may comprise a single message that notifies, in a abbreviated fashion, the Watcher of possible changes in any or all of the Watcher's subscriptions at the Subscription Service Host server (for example, additions or deletions of subscriptions by the Subscription Service Host server) or of Subscription Service Host server performance issues (for example, the Subscription Service Host server going down) since the last time the Watcher refreshed it's subscriptions, for example, since the most recent expiration of the 'subscription information refresh' time period.

In response to receiving the request from Watcher 106 to subscribe to each watched entity's user status information, Subscription Service Host server 110 may determine whether the Watcher is authorized to subscribe to, that is, to view, the watched entity's, or group of watched entities, user status information. Preferably, Subscription Service Host server 110 makes this determination by reference to the Presence Policy maintained by the Subscription Service Host server in association with the watched entity. For example, Watcher 106 may be authorized to view all, some but less than all, or none of the user status attributes associated with the watched entity. In response to determining that Watcher 106 is authorized to view, that is, subscribe to, one or more user status attributes associated with each requested watched entity, Subscription Service Host server 110 creates 304 in association with each of the requested watched entities, and stores in a list of subscriptions 118 associated with Watcher 106 and maintained in subscription database 116, a subscription associated with Watcher 106.

In response to creating the subscriptions, Subscription Service Host server 110 notifies (312) Watcher 106 of a state of each appropriate user status attribute by conveying, to the Watcher and for each subscription, a user status information notification. For example, if Watcher 106 is authorized to view all user status attributes associated with the watched entity, then Subscription Service Host server 110 may return a current state of all user status attributes requested by the Watcher. By way of another example, if second Watcher 114 is authorized, for example, based on content rules associated with the watched entity, to view some but less than all user status attributes associated with the watched entity, then Subscription Service Host server 110 may return a current state only of the requested and authorized user status attributes. In response to receiving each notification, Watcher 106 acknowledges (314) receipt of the notification, for example, by conveying an acknowledgment message to Subscription Service Host server 110.

Subsequent to creating the subscriptions, each of Users 120-123, and in particular Status Publication Sources 140-143, publishes (316) user status information updates, that is, updates of user status attributes, to Subscription Service Host server 110, such as an update of a location, an availability, a willingness, a mood, an activity, and so on, associated with the watched entity corresponding to the User. For each subscription created by Watcher 106, and based on the received user status attribute updates, Subscription Service Host server 110 stores (318) updated user status information, that is, updated states of the user status attributes, in subscription database 116 of the Subscription Service Host server, and more particularly, stores the updated user status information in association with each appropriate subscription in the list of subscriptions maintained by the Subscription Service Host server in association with Watcher 106.

In addition, in response to receiving the user status information updates, Subscription Service Host server 110 conveys (320) a notification to Watcher 106 notifying of the updated user status information, that is, of the updated states of the appropriate user status attributes. In various embodiments of the present invention, Subscription Service Host server 110 may convey such notifications to Watcher 106 each time a watched entity subscribed to by the Watcher publishes a user status information update, or Subscription Service Host server 110 may convey such notifications periodically or in response to receiving a predetermined number of user status information updates associated with a particular one or more subscriptions. In response to receiving each notification, Watcher 106 acknowledges (322) receipt of the notification, for example, by conveying a notification acknowledgement, to Subscription Service Host server 110.

Subsequent to creating the subscriptions, User 102, and in particular user terminal 104, drops (324) its connection with Subscription Service Host server 110, with the result that subscription information maintained by the user terminal falls out of synchronization with subscription information maintained by the Subscription Service Host server. For example, user terminal 104 may lose its connection to Subscription Service Host server 110 due to the Subscription Service Host server crashing or going down for any other reason. By way of another example, user terminal 104 may lose its wireless coverage, due to, for example, deterioration of a quality of the user terminal's wireless coverage or the user terminal roaming outside of an area of wireless coverage, and may no longer be able to wirelessly exchange messages with Subscription Service Host server 110.

While the connection is down, Subscription Service Host server 110 may continue to receive user status information updates from one or more of Status Publication Sources 140-143 and to convey (326) notifications of the updated user status information to Watcher 106. However, as the connection is down, user terminal 104, and in particular Watcher 106, does not receive, and correspondingly does not acknowledge, such notifications.

In response to failing to receive acknowledgements for a given number of notifications, Subscription Service Host server 110 may delete (328), from the list of subscriptions 118 associated with Watcher 106 and maintained in subscription database 116, one or more subscriptions associated with Watcher 106 and with the unacknowledged notifications. However, user terminal 104/Watcher 106 may be unaware of the deletion of such subscriptions, causing the subscription information maintained at the Subscription Service Host server and the user terminal, that is, the list of subscriptions 208 maintained at user terminal 104 and the list of subscriptions 118 maintained at Subscription Service Host server 110, to be out of synchronization. Correspondingly, user terminal 104, and more particularly Watcher 106, may be unaware that the Watcher will not receive further user status information update notifications associated with the deleted subscriptions, until the one or more subscriptions are refreshed by the user terminal/Watcher.

In various embodiments of the present invention, a threshold number of unacknowledged notifications triggering a deletion of a subscription from subscription database 116 may be set by a designer of communication system 100 or may be dynamically determined by Subscription Service Host server 110. For example, the threshold may be based on a total number of subscriptions maintained for Watcher 106 or a total number of subscriptions maintained at Subscription Service Host server 110, and/or the threshold may be set on a subscription-by-subscription basis for Watcher 106 or may be an overall, across-all-subscriptions, number of unacknowledged notifications for Watcher 106.

For example, suppose that the unacknowledged notifications all are associated with the first subscription of Watcher 106, that is, to the watched entity associated with User 120. In such an instance, in response to determining that notifications have not been acknowledged, Subscription Service Host server 110 may delete, from subscription database 116, the Watcher's first subscription, that is, the subscription to the watched entity associated with User 120, while continuing to maintain the Watcher's second and third subscriptions, that is, the subscriptions to the watched entities associated with User 121 and the group of watched entities associated with Users 122 and 123.

By way of another example, suppose that the unacknowledged notifications are associated with the first, second, and third subscriptions of Watcher 106, but only unacknowledged notifications concerning the first and second subscriptions of Watcher 106, that is, to the watched entities associated with Users 120 and 121, exceeds the threshold number of notifications. In such an instance, in response to determining that notifications $318_1$-$318_n$ have not been acknowledged, Subscription Service Host server 110 may delete, from subscription database 116, the Watcher's first and second subscriptions while continuing to maintain the Watcher's third subscription.

Subsequent to the loss of the connection between user terminal 104 and Subscription Service Host server 110, the user terminal and the Subscription Service Host server reestablish (330) their connection. For example, Subscription Service Host server 110 may come back up or user terminal 104 may regain lost wireless coverage, in response to which the user terminal and the Subscription Service Host server reestablish their connection. However, Watcher 106 may be unaware that the connection was lost, let alone know that one or more subscriptions of the Watcher may have been deleted by Subscription Service Host server 110 and that the Watcher will not receive further user status information update notifications until the one or more subscriptions are refreshed. In order to resynchronize the subscription information maintained at the user terminal and the Subscription Service Host server, communication system 100 provides for a consolidated status update of all subscriptions subscribed to by Watcher 106 without waiting for the 'subscription information refresh' time period to expire and the Watcher then refreshing each subscription on a subscription-by-subscription basis.

That is, subsequent to the loss of the connection between user terminal 104 and Subscription Service Host server 110, the second, 'subscription information consolidated status update' timer 214, maintained by user terminal 104, expires (332). In response to the expiration of second timer 214, user terminal 104, and in particular Watcher 106, conveys (334) a 'subscription information consolidated status update' (SICSU) request message to Subscription Service Host server 110. The SICSU request message requests that Subscription Service Host server 110 provide a consolidated status update of all subscriptions subscribed to by Watcher 106.

In response to receiving the SICSU request message, Subscription Service Host server 110 acknowledges (336) receipt of the message, for example, by conveying a SICSU request message acknowledgement to user terminal 104/ Watcher 106, and further assembles, and conveys (340) to user terminal 104, an SICSU notification message. In assembling the SICSU notification message, Subscription Service Host server 110 determines (338), and includes in the SICSU notification message, a first one or more SICSU values, which values each provides an indication of the total number of currently active individual and group, or RLS, subscriptions of Watcher 106 without providing complete details of each such subscriptions.

For example, in various embodiments of the present invention, the first one or more SICSU values may comprise one or more of:
  a first SICSU value that is computed by Subscription Service Host server 110 based on the list of currently active subscriptions of Watcher 106,
  a second SICSU value that indicates the number of currently active individual and group, or RLS, subscriptions of Watcher 106,
  a third SICSU value that indicates a cumulative time period since the Subscription Service Host server last went down (for example, an "up-since" time period),
  a fourth SICSU value that indicates a number of Host-deleted subscriptions, that is, subscriptions of Watcher 106 that have been deleted by Subscription Service Host server 110 from the Subscription Service Host server's list of subscriptions associated with Watcher 106 since the Subscription Service Host server last successfully conveyed a user status information notification or a user status information update notification to user terminal 104, and in particular to Watcher 106 (or from another perspective, subscriptions that have been deleted by Subscription Service Host server 110 with respect to Watcher 106 since user terminal 101 last successfully received a user status information notification or a user status information update notification with respect to Watcher 106),
  a fifth SICSU value that indicates a number of Host-added subscriptions, that is, subscriptions of Watcher 106 that have been added to the Subscription Service Host server's list of subscriptions associated with Watcher 106 since the Subscription Service Host server last successfully conveyed a user status information notification or a user status information update notification to user terminal 104, and in particular to Watcher 106 (or from another perspective, subscriptions that have been added by Subscription Service Host server 110 with respect to Watcher 106 since user terminal 101 last successfully received a user status information notification or a user status information update notification with respect to Watcher 106), and
  a sixth SICSU value comprising a comprehensive list of all currently active subscriptions of Watcher 106.

The first value may be calculated based on an algorithm maintained by at least one memory device 206 and executed by processor 204, which algorithm generates a value that is based on the list of active subscriptions of Watcher 106, for example, an algorithm that computes a value based on subscription identifiers, or watched entity identifiers, for all of the subscriptions currently subscribed to by the Watcher, such as a sum of all such values or a hash of a list of such values.

In response to receiving the SICSU notification message, user terminal 104, and in particular Watcher 106, acknowledges (342) receipt of the SICSU notification message, for example, by conveying a SICSU notification message acknowledgment back to Subscription Service Host server 110, and performs (344) a first determination of a second one or more corresponding SICSU values based on the list of subscriptions 208 maintained by the user terminal User terminal 104/Watcher 106 then compares (346) the second one or more SICSU values determined by the user terminal to the first one or more corresponding SICSU values included in the received SICSU notification message to produce a first comparison. User terminal 104 may determine the corresponding SICSU value(s) at any time subsequent to the re-establishment of the connection with Subscription Service Host server 110 and may do so based on the list of subscriptions maintained by the user terminal.

Based on the first comparison, user terminal 104 performs (348) a first determination of whether the user terminal is out of synchronization with Subscription Service Host server 110. For example, when the SICSU value(s) included in the received SICSU notification message matches the corresponding SICSU value(s) determined by user terminal 104, the user terminal may determine (362) that it is synchronized with Subscription Service Host server 110 and logic flow 300 then ends (366). When the SICSU value(s) included in received SICSU notification message does not match the corresponding SICSU value(s) determined by user terminal 104, the user terminal may determine (364) that it is out of synchronization with Subscription Service Host server 110. In response to determining that it is out of synchronization with Subscription Service Host server 110, user terminal 104/Watcher 106, with reference to the list of subscriptions 208 maintained by the user terminal, may re-initiate (366) one or more of the multiple subscriptions of Watcher 106 at Subscription Service Host server 110 and logic flow 300 then ends (380).

In another embodiment of the present invention, in response to determining, by user terminal 104 and based on the first comparison, that it is out of synchronization with Subscription Service Host server 110, the user terminal may confirm whether it is out of synchronization with the Subscription Service Host server by performing (350) a determination of a third one or more of SICSU values, wherein the determination of the third one or more of SICSU values is performed based on the list of subscriptions 208 maintained by the user terminal and with the Host-deleted subscriptions deleted from the list (at least for the purpose of determining the third one or more of SICSU values). User terminal 104 then compares (352) the third one or more SICSU values to corresponding first one or more SICSU values included in received SICSU notification message to produce a second comparison.

Based on the second comparison, user terminal 104 performs (354) a second determination of whether it is out of synchronization with Subscription Service Host server 110. For example, when the third one or more of SICSU values matches the corresponding first one or more SICSU value(s) included in the received SICSU notification message, user terminal 104/Watcher 104 may determine (368) that it is synchronized with Subscription Service Host server 110 except for the subscriptions deleted by the Subscription Service Host server. User terminal 104/Watcher 104 then may re-initiate (370) the subscriptions of Watcher 106 deleted by Subscription Service Host server 110 and logic flow 300 then ends (380).

When the third one or more SICSU value(s) does not match the corresponding first one or more SICSU value(s) included in the received SICSU notification message, the user terminal may determine (364) that it is out of synchronization with Subscription Service Host server 110. In response to determining that it is out of synchronization with Subscription Service Host server 110, user terminal 104/Watcher 106, with reference to the list of subscriptions 208 maintained by the user terminal, may re-initiate (366) one or more of the multiple subscriptions of Watcher 106 at Subscription Service Host server 110 and logic flow 300 then ends (380).

In yet another embodiment of the present invention, in response to determining, by user terminal 104 and based on the second comparison, that it is out of synchronization with Subscription Service Host server 110, the user terminal may re-confirm whether it is out of synchronization with the Subscription Service Host server by performing (356) a determination of a fourth one or more SICSU values, wherein the determination of the fourth one or more of SICSU values is performed based on the list of subscriptions 208 maintained by the user terminal and with the Host-deleted subscriptions and the Host-added subscriptions removed from the determination (at least for the purpose of determining the fourth one or more of SICSU values). User terminal 104 then compares (358) the fourth one or more SICSU values to the corresponding first one or more SICSU values included in the received SICSU notification message to produce a third comparison.

Based on the third comparison, user terminal 104 performs (360) a third determination of whether it is out of synchronization with Subscription Service Host server 110. For example, when the fourth one or more SICSU value(s) match the corresponding first one or more SICSU value(s) included in the received SICSU notification message, user terminal 104 may determine (372) that it is synchronized with Subscription Service Host server 110 except for the subscriptions deleted by the Subscription Service Host server and added by the Subscription Service Host server but not yet included in the user terminal's list of subscriptions. User terminal 104/Watcher 104 then may re-initiate (374) the subscriptions of Watcher 106 deleted by Subscription Service Host server 110 and add (376), to the list of subscriptions 208 maintained by the user terminal, the subscriptions of Watcher 106 added by Subscription Service Host server 110 but not yet included in the user terminal's list of subscriptions. Logic flow 300 then ends (380).

When the fourth one or more SICSU value(s) do not match the corresponding first one or more SICSU value(s) included in the received SICSU notification message, the user terminal may determine (364) that it is out of synchronization with Subscription Service Host server 110. In response to determining that it is out of synchronization with Subscription Service Host server 110, user terminal 104/Watcher 106, with reference to the list of subscriptions 208 maintained by the user terminal, may re-initiate (366) one or more of the multiple subscriptions of Watcher 106 at Subscription Service Host server 110 and logic flow 300 then ends (380).

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus. For example, a request to view a user status attribute does not preclude the request from comprising a request to view multiple user status attributes.

What is claimed is:

1. A method for determining a synchronization with respect to multiple presence service subscriptions, the method comprising:
   conveying, by a user terminal to a Subscription Service Host, multiple subscription messages associated with a Watcher, wherein each subscription message of the multiple subscription messages initiates a subscription associated with the Watcher and requests user status information associated with watched entities;
   starting a timer;
   in response to an expiration of the timer, conveying a subscription information consolidated status update (SICSU) request to the Subscription Service Host, wherein the SICSU request requests that the Subscription Service Host provide a consolidated status update of the multiple subscriptions associated with the Watcher;
   in response to conveying the SICSU request, receiving an SICSU notification comprising a first SICSU values, wherein the SICSU values indicate a status of multiple subscriptions associated with the Watcher;
   determining, by the user terminal, a corresponding second SICSU values based on a list of subscriptions maintained by the user terminal and associated with the Watcher;
   comparing the first SICSU values to the second SICSU values to produce a comparison; and
   determining, by the user terminal, whether the user terminal is out of synchronization with the Subscription Service Host based on the comparison.

2. The method of claim 1, wherein determining whether the user terminal is out of synchronization with the presence server comprises, when the first SICSU values to the second SICSU values, determining that the user terminal is out of synchronization with the Subscription Service Host and wherein the method further comprises re-initiating, by the user terminal with the Subscription Service Host, of the subscriptions associated with the Watcher.

3. The method of claim 1, further comprising determining that a connection has been lost and re-established with the Subscription Service Host and wherein conveying a subscription information consolidated status update (SICSU) request to the Subscription Service Host comprises conveying an SICSU request to the Subscription Service Host in response to the expiration of the timer and the re-establishment of the connection to the Subscription Service Host.

4. The method of claim 1, wherein determining whether the user terminal is out of synchronization with the Subscription Service Host comprises, when the first SICSU values match the second SICSU values, determining by the user terminal that the user terminal is synchronized with the Subscription Service Host.

5. The method of claim 1, wherein the comparison is a first comparison and wherein the method further comprises:
   when the first SICSU values do not match the second SICSU values, determining, by the user terminal, a corresponding third SICSU values based on the list of subscriptions maintained by the user terminal and associated with the Watcher with Subscription Service Host-deleted subscriptions deleted from the list, wherein Subscription Service Host-deleted subscriptions comprises subscriptions that have been deleted with respect to the Watcher since the user terminal last successfully received a user status information notification or a user status information update notification with respect to the Watcher;
   comparing the first SICSU values to the third SICSU values to produce a second comparison; and
   determining, by the user terminal, whether the user terminal is out of synchronization with the Subscription Service Host based on the second comparison.

6. The method of claim 5, wherein determining whether the user terminal is out of synchronization with the Subscription Service Host comprises, when the first SICSU values match the third SICSU values, determining by the user terminal that the user terminal is synchronized with the Subscription Service Host.

7. The method of claim 6, further comprising, in response to determining that the user terminal is synchronized with the Subscription Service Host, re-initiating, by the user terminal with the Subscription Service Host, the Subscription Service Host-deleted subscriptions.

8. The method of claim 5, wherein the method further comprises:
   when the first SICSU values do not match either the second SICSU values or the third SICSU values, determining, by the user terminal, a corresponding fourth SICSU values based on the list of subscriptions maintained by the user terminal and associated with the Watcher with the Subscription Service Host-deleted subscriptions and Subscription Service Host-added subscriptions deleted from the list, wherein Subscription Service Host-added subscriptions comprises subscriptions that have been added with respect to the Watcher since the user terminal last successfully received a user status information notification or a user status information update notification with respect to the Watcher;
   comparing the first SICSU values to the fourth SICSU values to produce a third comparison; and
   determining, by the user terminal, whether the user terminal is out of synchronization with the Subscription Service Host based on the third comparison.

9. The method of claim 8, wherein determining whether the user terminal is out of synchronization with the Subscription Service Host server comprises, when the first SICSU values match the fourth SICSU values, determining by the user terminal that the user terminal is synchronized with the Subscription Service Host.

10. The method of claim 9, further comprising, in response to determining that the user terminal is synchronized with the Subscription Service Host, adding the Subscription Service Host-added subscriptions to the list of subscriptions maintained by the user terminal.

11. A method for determining a synchronization with respect to multiple presence service subscriptions, the method comprising:
   maintaining multiple subscriptions associated with a Watcher;
   receiving a subscription information consolidated status update (SICSU) request from a user terminal associated with the Watcher, wherein the SICSU request requests a provision of a consolidated status update of multiple subscriptions associated with the Watcher; and
   in response to receiving the SICSU request, conveying a SICSU notification comprising a first SICSU values, wherein each SICSU value of the SICSU values indicate a status of multiple subscriptions associated with the Watcher.

12. A user terminal configured to support a presence service, the user terminal comprising:
an at least one memory device that is configured to maintain a list of subscriptions associated with a Watcher implemented by the user terminal; and
a processor that is configured to:
convey, to a Subscription Service Host, multiple subscription messages associated with the Watcher, wherein each subscription message of the multiple subscription messages initiates a subscription associated with the Watcher and requests user status information associated with watched entities;
start a timer;
in response to an expiration of the timer, convey a subscription information consolidated status update (SICSU) request to the Subscription Service Host, wherein the SICSU request requests that the Subscription Service Host provide a consolidated status update of multiple subscriptions associated with the Watcher;
in response to convey the SICSU request, receive a SICSU notification comprising a first SICSU values, wherein the SICSU values indicate a status of multiple subscriptions associated with the Watcher;
determine a corresponding second SICSU values based on the list of subscriptions maintained by the user terminal and associated with the Watcher;
compare the first SICSU values to the second SICSU values to produce a comparison; and
determine whether the user terminal is out of synchronization with the Subscription Service Host based on the comparison.

13. The user terminal of claim 12, wherein the processor is configured to determine whether the user terminal is out of synchronization with the Subscription Service Host by, when the first SICSU values to the second SICSU values, determining that the user terminal is out of synchronization with the Subscription Service Host and wherein the method further comprises re-initiating, by the user terminal with the Subscription Service Host, of the subscriptions associated with the Watcher.

14. The user terminal of claim 12, wherein the processor further is configured to determine that a connection has been lost and re-established with the Subscription Service Host and wherein the processor is configured to convey a subscription information consolidated status update (SICSU) request to the Subscription Service Host by conveying an SICSU request to the Subscription Service Host in response to the expiration of the timer and the re-establishment of the connection to the Subscription Service Host.

15. The user terminal of claim 12, wherein the processor is configured to determine whether the user terminal is out of synchronization with the Subscription Service Host by, when the first SICSU values match the second SICSU values, determine that the user terminal is synchronized with the Subscription Service Host.

16. The user terminal of claim 12, wherein the comparison is a first comparison and wherein the processor further is configured to:
when the first SICSU values do not match the second SICSU values, determine a corresponding third SICSU values based on the list of subscriptions maintained by the user terminal and associated with the Watcher with Subscription Service Host-deleted subscriptions deleted from the list, wherein Subscription Service Host-deleted subscriptions comprises subscriptions that have been deleted with respect to the Watcher since the user terminal last successfully received a user status information notification or a user status information update notification with respect to the Watcher;
compare the first SICSU values to the third SICSU values to produce a second comparison; and
determine whether the user terminal is out of synchronization with the Subscription Service Host based on the second comparison.

17. The user terminal of claim 16, wherein the processor is configured to determine whether the user terminal is out of synchronization with the Subscription Service Host by, when the first SICSU values match the third SICSU values, determining by the user terminal that the user terminal is synchronized with the Subscription Service Host.

18. The user terminal of claim 17, wherein the processor is configured to, in response to determining that the user terminal is synchronized with the Subscription Service Host, re-initiate, with the Subscription Service Host, the Host-deleted subscriptions.

19. The user terminal of claim 16, wherein the wherein the processor further is configured to:
when the first SICSU values do not match either the second SICSU values or the third SICSU values, determine, by the user terminal, a corresponding fourth SICSU values based on the list of subscriptions maintained by the user terminal and associated with the Watcher with the Subscription Service Host-deleted subscriptions and Subscription Service Host-added subscriptions deleted to the list, wherein Subscription Service Host-added subscriptions comprises subscriptions that have been added with respect to the Watcher since the user terminal last successfully received a user status information notification or a user status information update notification with respect to the Watcher;
compare the first SICSU values to the fourth SICSU values to produce a third comparison; and
determine whether the user terminal is out of synchronization with the Subscription Service Host based on the third comparison.

20. The user terminal of claim 19, wherein the processor is configured to determine whether the user terminal is out of synchronization by, when the first SICSU values match the fourth SICSU values, determining by the user terminal that the user terminal is synchronized with the Subscription Service Host.

21. The user terminal of claim 20, wherein the processor further is configured to, in response to determining that the user terminal is synchronized with the Subscription Service Host, add the Subscription Service Host-added subscriptions to the list of subscriptions maintained by the user terminal.

22. A Subscription Service Host server configured to support a presence service, the Subscription Service Host server comprising:
an at least one memory device that is configured to maintain multiple subscriptions associated with a Watcher; and
a processor that is configured to:
receive a subscription information consolidated status update (SICSU) request from a user terminal associated with the Watcher, wherein the SICSU request requests a provision of a consolidated status update of multiple subscriptions associated with the Watcher; and
in response to receiving the SICSU request, conveying a SICSU notification comprising a first SICSU values, wherein each SICSU value of the SICSU values indicate a status of multiple subscriptions associated with the Watcher.

* * * * *